(12) United States Patent
Mason

(10) Patent No.: US 10,835,773 B2
(45) Date of Patent: Nov. 17, 2020

(54) ROTATING TISSUE DIGESTOR SYSTEM AND METHOD OF USE

(71) Applicant: Philip Mason, Hamilton (BR)

(72) Inventor: Philip Mason, Hamilton (BR)

( * ) Notice: Subject to any disclaimer, the term of this patent is extended or adjusted under 35 U.S.C. 154(b) by 0 days.

(21) Appl. No.: 16/567,216

(22) Filed: Sep. 11, 2019

(65) Prior Publication Data

US 2020/0238117 A1 Jul. 30, 2020

Related U.S. Application Data

(60) Provisional application No. 62/798,142, filed on Jan. 29, 2019.

(51) Int. Cl.
*A62D 3/36* (2007.01)
*B09B 5/00* (2006.01)

(52) U.S. Cl.
CPC . *A62D 3/36* (2013.01); *B09B 5/00* (2013.01)

(58) Field of Classification Search
CPC ... A62D 3/00; A62D 3/30; A62D 3/36; B09B 5/00
See application file for complete search history.

(56) References Cited

U.S. PATENT DOCUMENTS

| 7,910,788 | B2 * | 3/2011 | Wilson | A61L 2/04 422/28 |
| 9,492,697 | B2 * | 11/2016 | Wilson | B01J 19/28 |
| 2009/0004714 | A1 * | 1/2009 | Norholm | B09B 3/00 435/165 |

* cited by examiner

*Primary Examiner* — Natasha E Young

(57) ABSTRACT

A tissue digester system includes a container for housing a digestion chamber having an exterior vessel for holding digestor fluid and an interior vessel, the container extending from a first end to a second end, the interior vessel having perforations and having baffles extending from an interior surface of the interior vessel; a lid secured to the exterior vessel and to provide access to the digestion chamber; one or more heating elements positioned to apply heat to the digestion chamber; a motor engaged with the interior vessel and to create rotational movement of the interior vessel; a control system, having a temperature controller; and a movement controller; the control system is to rotate the interior vessel and heat the digestion chamber based on user commands; and the digestion chamber is to break down remains through application of the digestor fluid to the tissue remains.

26 Claims, 12 Drawing Sheets

ROTATING TISSUE DIGESTOR SYSTEM AND METHOD OF USE

This application claims the benefit of U.S. Provisional Patent Application No. 62/798,142, filed Jan. 29, 2019, and claims priority to Canadian Patent Application Serial No. CA3050588, filed on Jul. 25, 2019, which are incorporated by reference.

BACKGROUND

1. Field of the Invention

The present invention relates generally to the disposal of remains, including animal remains and human remains, and more specifically to a tissue digester system that provides for an energy efficient means to digest tissue.

2. Description of Related Art

The disposal of remains is a common practice for both animals and humans. Veterinary offices, animal shelters, small farms and individual pet owners frequently require disposal of animal carcasses. Further, when a loved one or family member passes, this too requires disposal of the body. In FIG. 1, a flowchart 101 depicts conventional methods associated with remains disposal. For example, one common method is through the burial of the remains, as shown with box 103. The second most common method is through flame incineration of the remains, as shown with box 105. Flame incineration produces large amounts of carbon dioxide and requires extensive energy consumption, as shown with boxes 107, 109. Further, in some locations land burial is prohibited by law or impractical within the confines of a city. Accordingly, it is desirable and an object of the present invention to provide a cremation solution that is simple, cost effective, and efficient system to speed up the digestive process during alkaline hydrolysis of animal tissue that does not suffer from the problems or deficiencies associated with prior solutions.

In recent years alkaline hydrolysis tissue digestors have been increasingly used as a more environmentally acceptable alternative to land burial or incineration for the orderly and safe disposition of deceased animals. With alkaline hydrolysis, the process includes exposing soft tissue to a strong, heated alkaline solution for predetermined periods of time depending on the process temperatures and pressures. At the end of the process, the fully dissolved fluidized tissue is then considered safe to discharge into the environment either through the sewerage system or dispersed as liquid fertilizer. The sterile bones and teeth typically remain at the end of the process and can be crushed into a powder that may be used as a soil additive or presented to the pet owner in a memorial urn in much the same way as ash from a crematory.

It would be desirable to have a method of performing alkaline hydrolysis tissue digestion that can process multiple carcasses, individually separated within a non-pressurized system that is simple, safe and economical to operate.

3. Brief Summary

The present invention relates generally to a machine that is a container with an exterior vessel and an interior vessel, the vessels creating a digestion chamber to receive remains therein for digestion. The container is configured to receive a liquid, such as an alkaline digestive fluid, receive heat, and rotate, thereby creating an environment wherein the soft tissue will be safely dissolved and separated from solid bone material. At the end of the process the sterile dissolved tissue fluid can be safely discharged into the environment leaving only the mineral ash of the bones and teeth behind for further processing into powdered remains.

Advantages of the present invention will become obvious to the reader and it is intended that these advantages are within the scope of the present invention.

This invention may be embodied in the form illustrated in the accompanying drawings, attention being called to the fact, however, that the drawings are illustrative only, and that changes may be made in the specific construction illustrated and described within the scope of this application.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
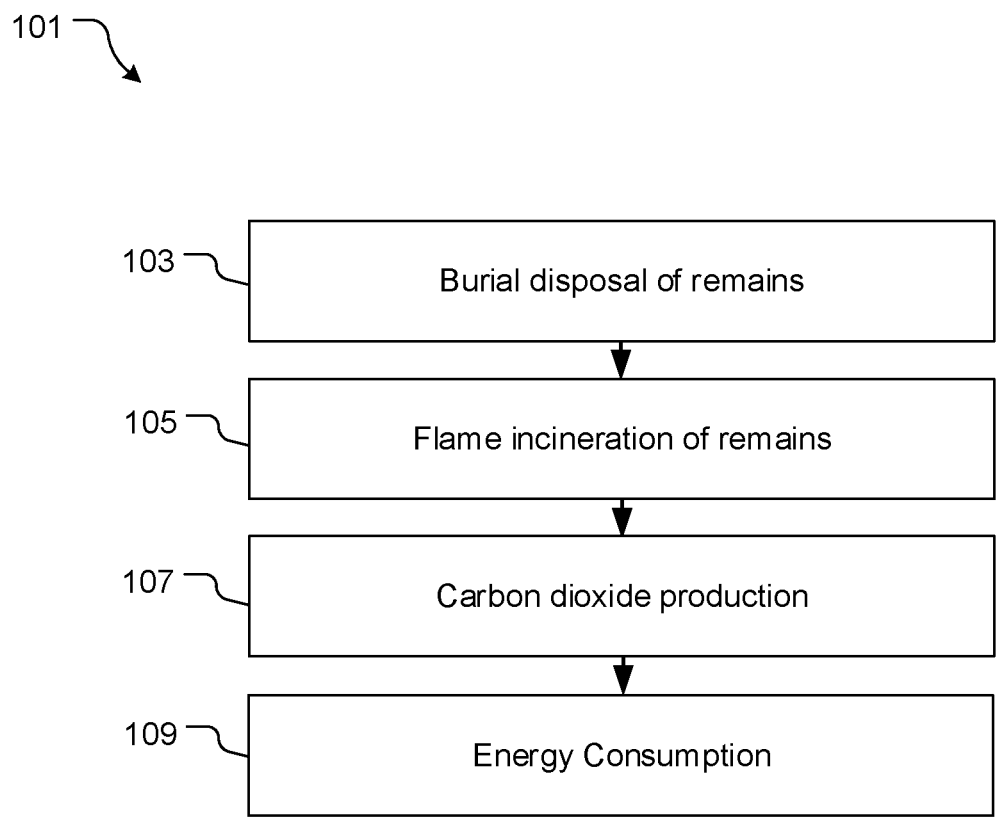
FIG. 1 is a flowchart of the method associated with conventional tissue disposal.
Figure 2:
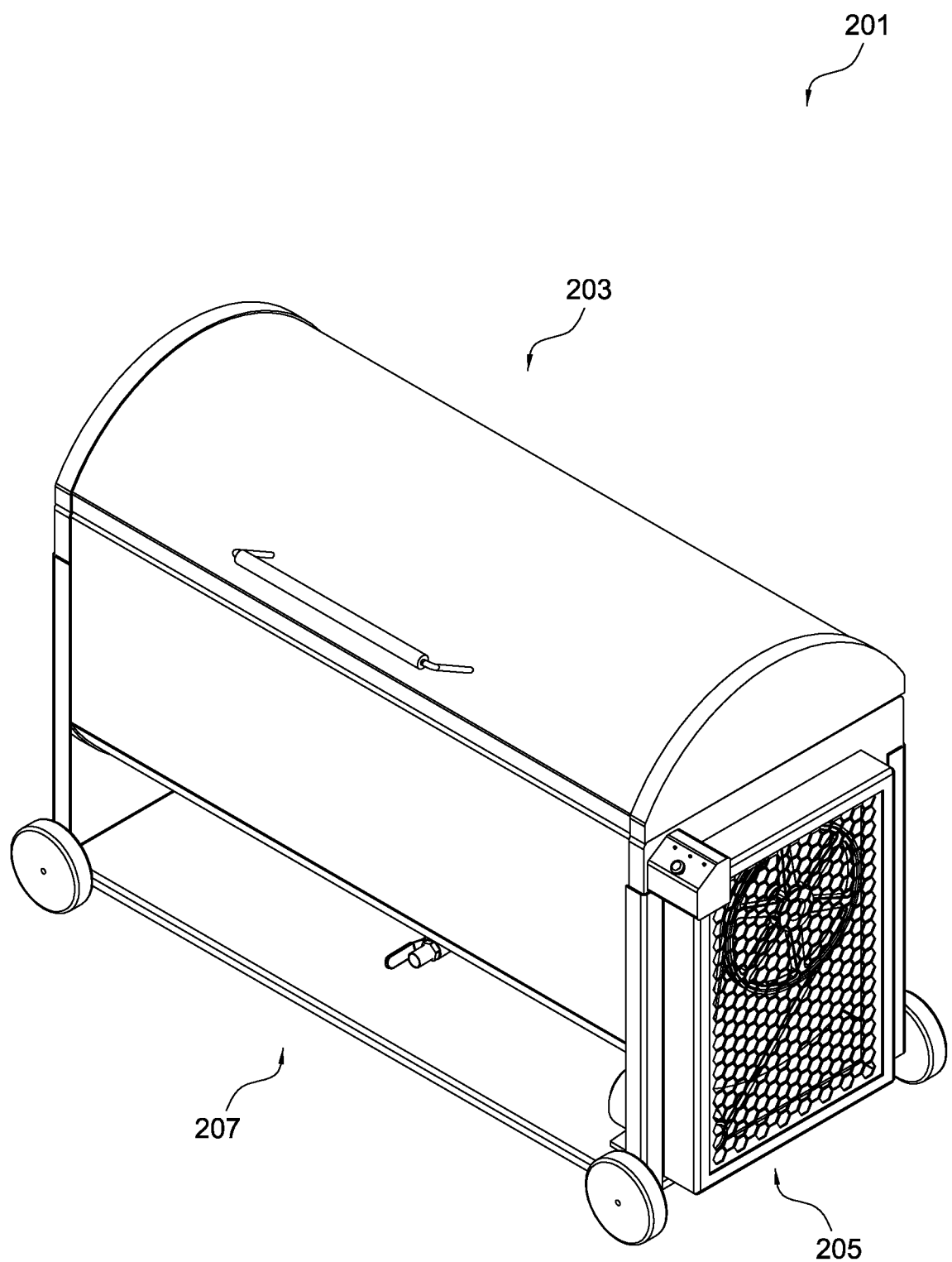
FIG. 2 is a front isometric view of a tissue digester system in accordance with a preferred embodiment of the present application.
Figure 3:
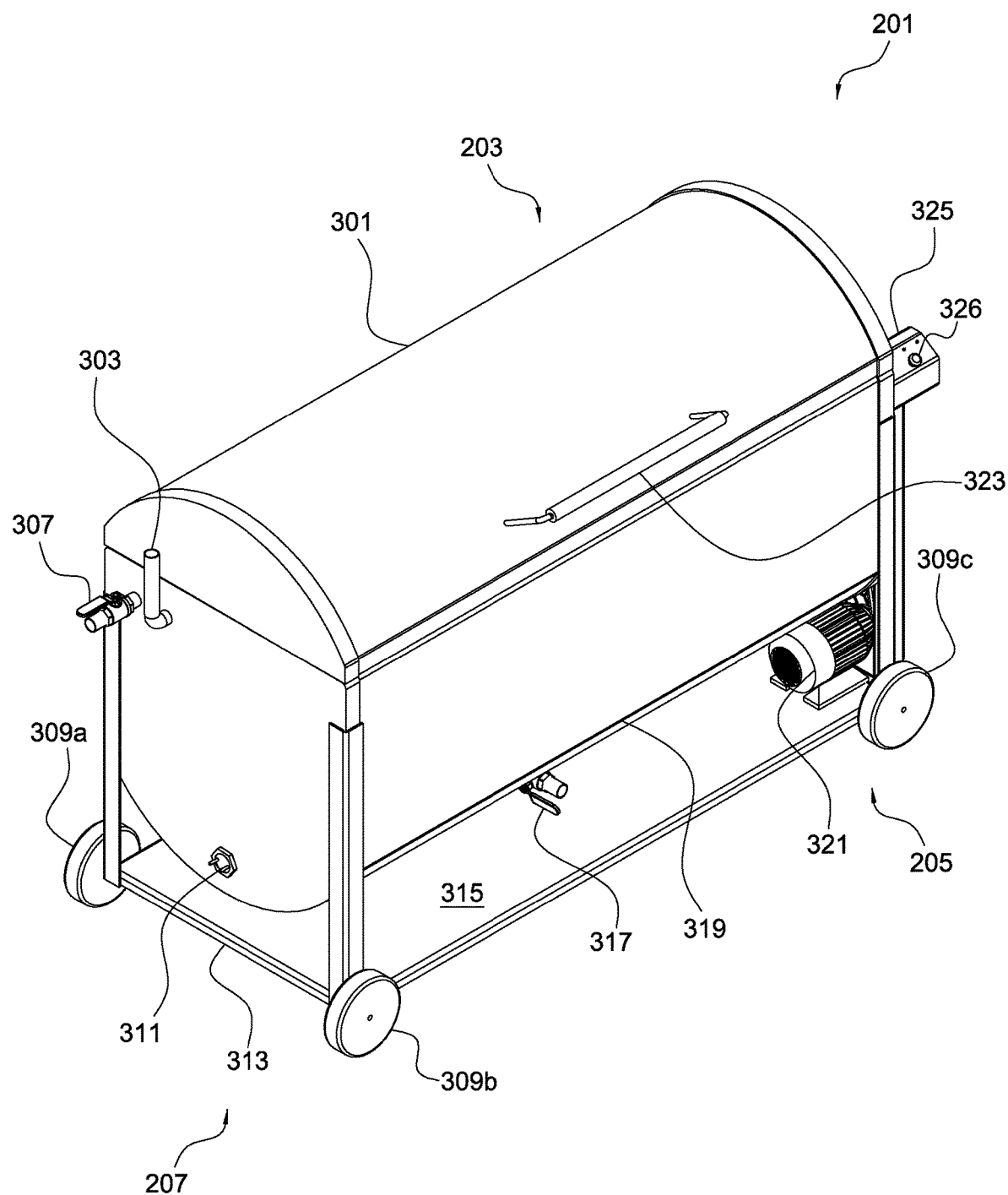
FIG. 3 is a left side front isometric view of the tissue digester system of FIG. 2.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 2-7 depict various views of a tissue digestion system 201 in accordance with a preferred embodiment of the present application.

Figure 4:
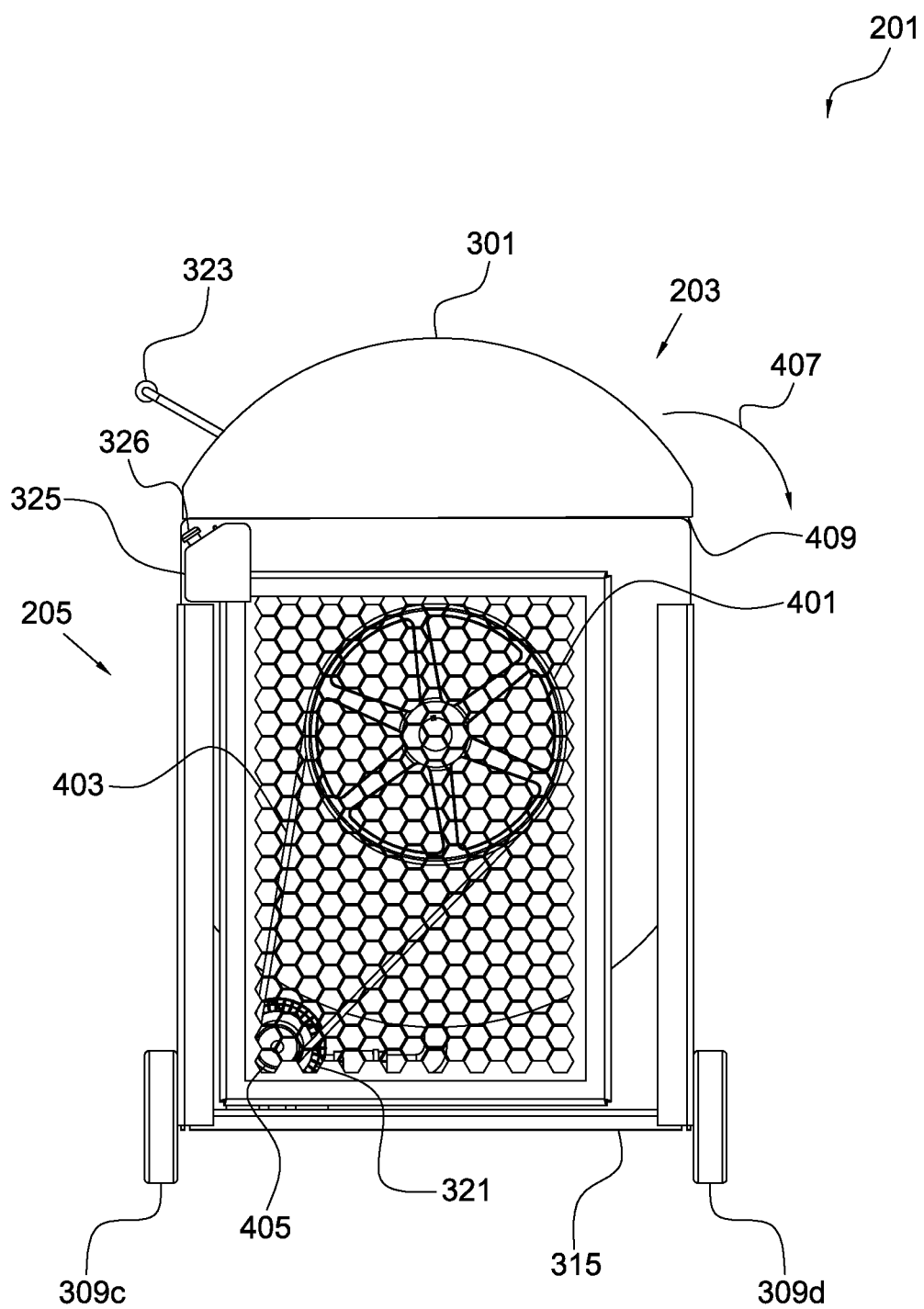
FIG. 4 is an end view of the tissue digester system of FIG. 2.

System 201 includes a container 203 for housing a digestion chamber, the container 203 being supported by a support system 207 and having a control system 205 for controlling various aspects of the digestion process. As shown, the container 203 includes a lid 301 with one or more handles 323 and attached to an exterior vessel 319, wherein the lid 301 is configured to provide access to the digestion chamber. As shown in FIG. 4, the lid 301 is configured to open and close 407 against the container, thereby providing a user with access to the digestion chamber. It should be appreciated that although the lid is shown on the top of the exterior vessel, it is contemplated that the lid could vary in location, size, style, and the like.

Figure 5:
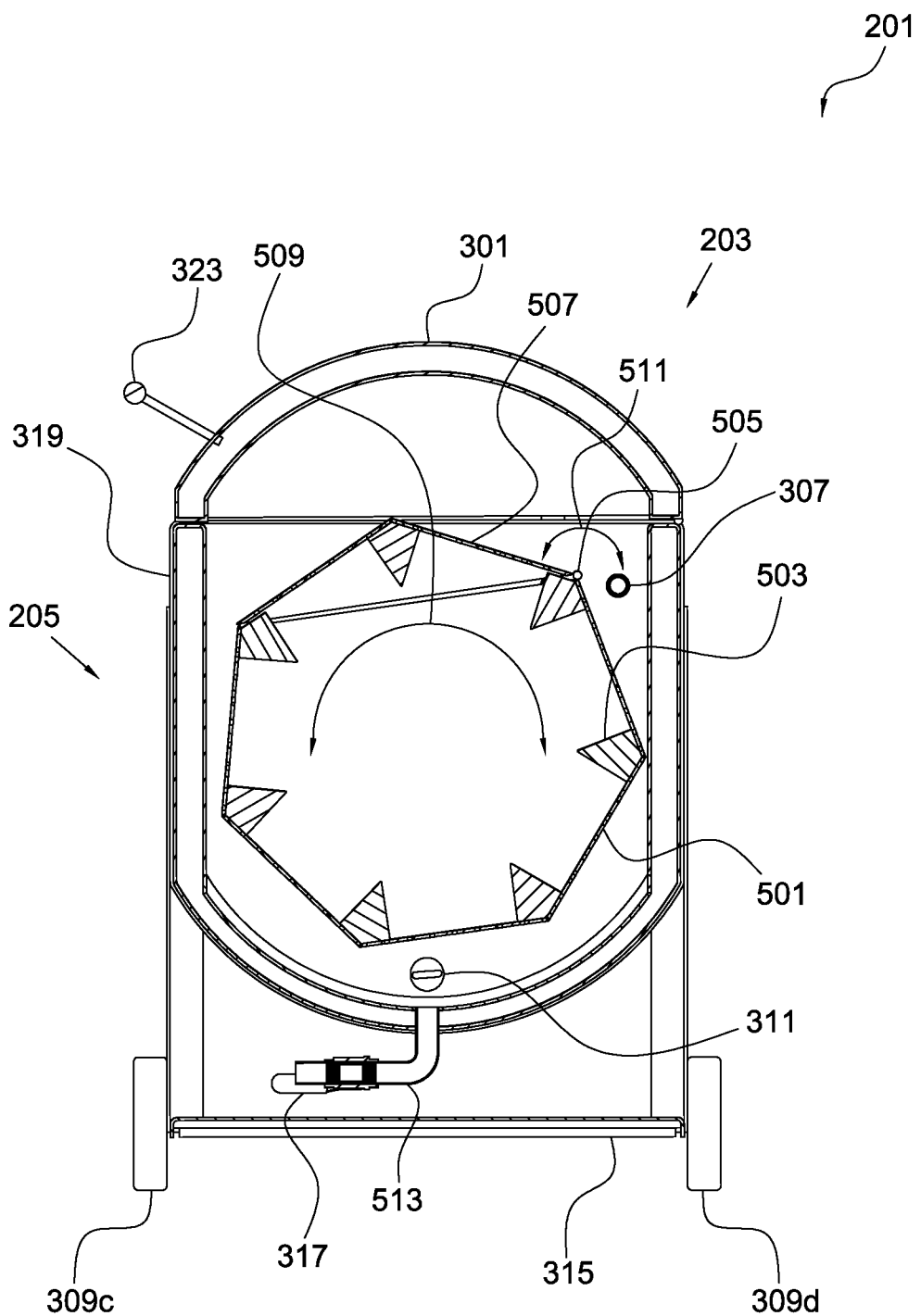
FIG. 5 is an end cross sectional view of the tissue digester system of FIG. 2.

The exterior vessel 319 is supported above a ground surface by the support system 207, which can include a base 313 with a top surface 315, as well as one or more wheels 309a-c, thereby allowing for portability of the system. It should be appreciated that the support system 207 may vary based on aesthetical, functional, or manufacturing considerations. As best shown in FIG. 5, the exterior vessel can be double walled, wherein an insulation is placed between the walls. It should be appreciated that the insulation can be a spray foam or the like.

System 201 further includes a motor 321 in communication with the control system 205, the motor 321 configured to provide rotational movement of an interior vessel 501. It should be appreciated that various means of rotation are contemplated. As shown in FIG. 4, one means of rotation can include one or more gears 405, engaged with one or more flywheels 401, via one or more belts 403. As discussed, the control system 205 is configured to operate rotation, such as through one or more panels 325 and controls 326 as will be discussed in more detail herein. System 201 further including a heating element 311, such as an electronic heating element.

System 201 further includes fluid flow controls, including a fluid inlet 307 and a drain 317. As shown in FIG. 5, a drain tube 513 connects the inside of the digestion chamber with the valve 317. System 201 further including a gas exhaust vent pipe 303. It should be appreciated that the valves can be electronic valves in communication with the control system.

Figure 6:
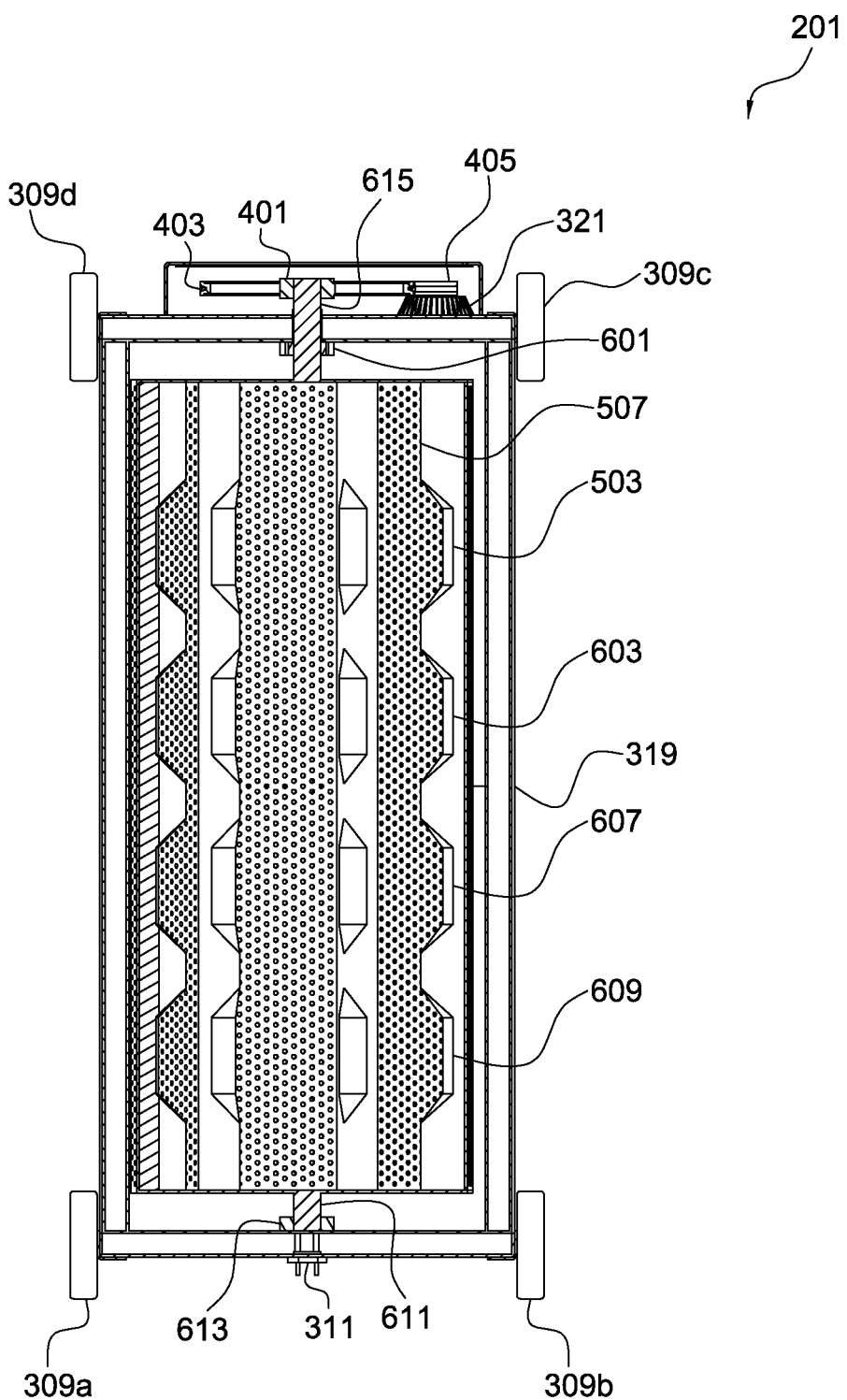
FIG. 6 is a top open view of the tissue digester system of FIG. 2.

Referring now to FIG. 6, as shown, the container 205 houses an interior vessel 501, the interior vessel extending from a first end to a second end and having a plurality of baffles 503 that extend into an interior area, thereby providing for an object to aid in breaking up and dissolving the soft tissue remains. It should be appreciated that the baffles 503 can extend the entire length of the interior vessel or a partial length. In addition, it should be appreciated that the plurality of baffles can vary in shape and size based on aesthetical, functional, and manufacturing considerations.

As further shown, the interior vessel 501 includes a lid 507 pivotally attached 511 via one or more hinges 505, thereby providing access to the inside of the interior vessel. The interior vessel 501 is engaged with the motor, wherein the motor provides rotational movement 509 of the interior vessel.

In FIG. 6, a top view of an open container is shown for clarity. As shown, the interior vessel 501 can be composed of a perforated steel, thereby allowing for fluid flow around and into the interior vessel 501. Further, this illustration depicts the plurality of baffles 503, 603, 607, 609 extending the length of the interior vessel. It should be appreciated that the exterior vessel is configured to receive the digestion fluid, such as a strong alkaline (base) digestive fluid.

As further shown, the interior vessel 501 is supported by a support system, the support system including one or more shafts 611, 615 and one or more gears 601, 613 that allow for engagement with the motor, such that the motor can provide rotational movement thereto.

Figure 7:
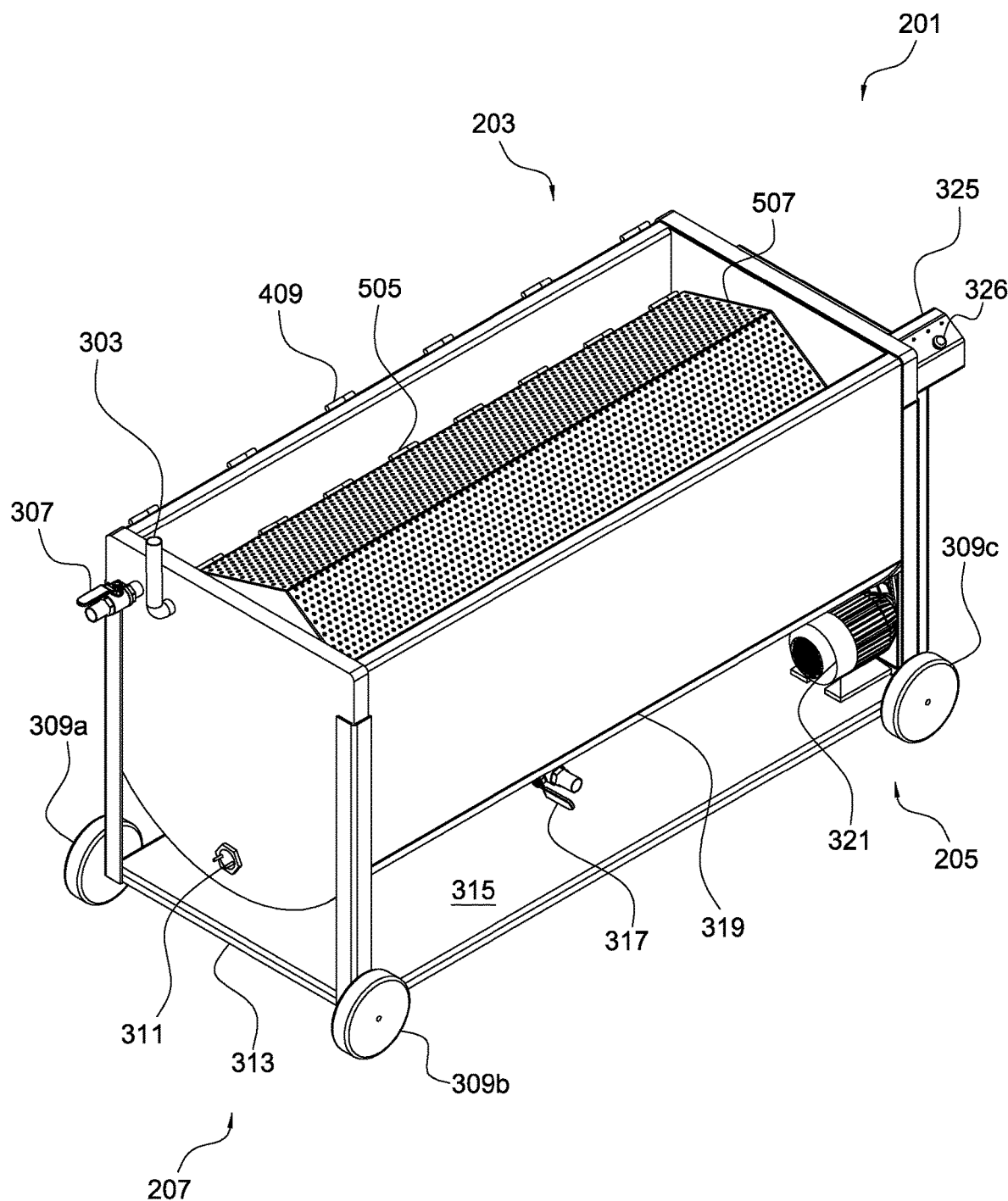
FIG. 7 is an isometric open view of the tissue digester system of FIG. 2.

In FIG. 7, an open view further depicts system 201 for clarity.

Figure 8:
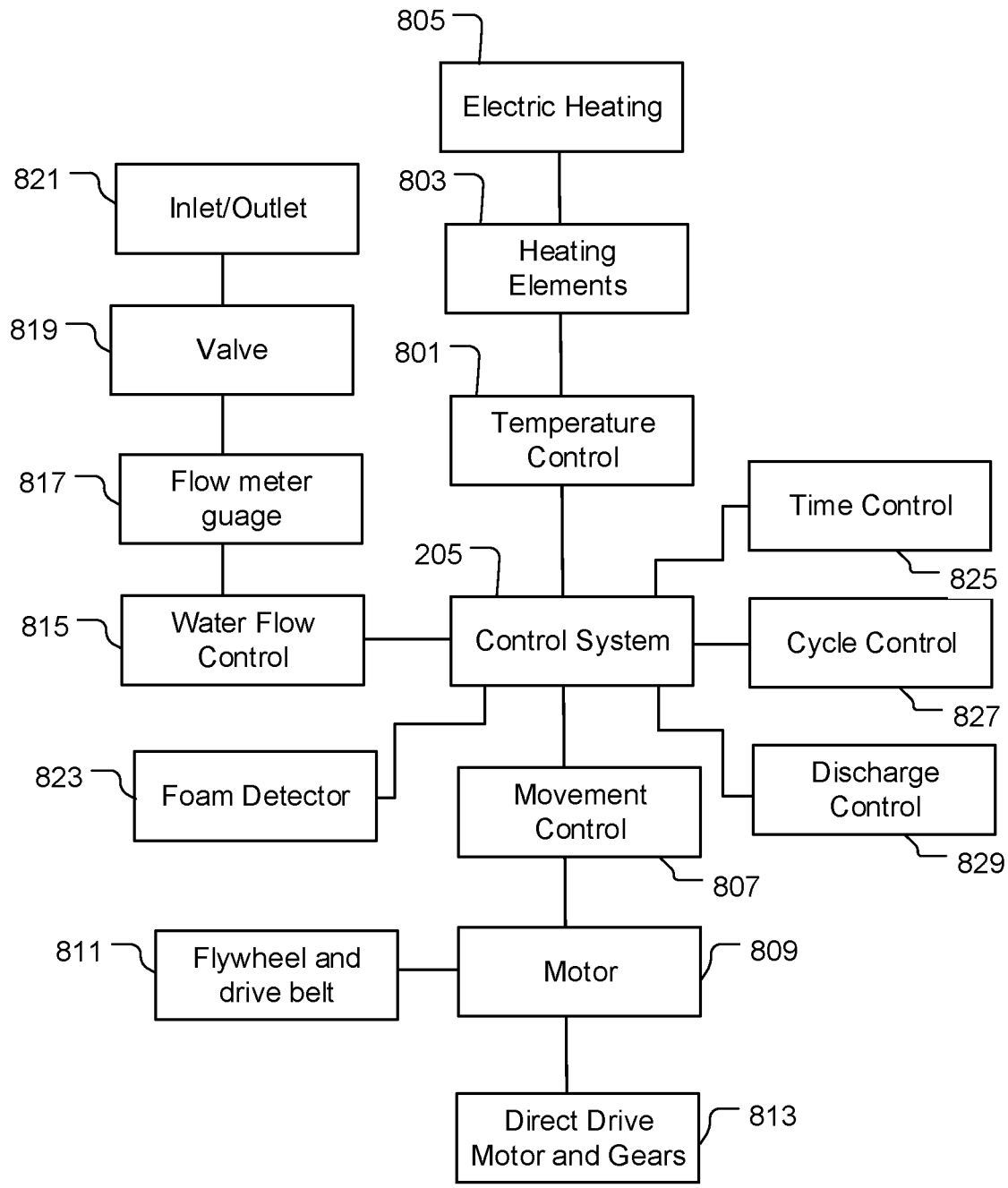
FIG. 8 is a schematic of a control system of the tissue digester system of FIG. 2.

In FIG. 8, a simplified schematic depicts the features associated with the control system 205. The control system 205 being configured to operate a temperature control 801 associated with the digestion chamber. The temperature control 801 can be achieved via various features, such as one or more heating elements 311, 803, such as electric heating elements 311,805. In some embodiments, it is contemplated that the electric heating elements 805 are placed directly in the digestion chamber.

The control system 205 is further configured to operate movement control 807 by being in communication with the motor 809. It should be appreciated that the motor 809 may engage with various elements to rotate the interior vessel as is known in the art. For example, the motor 809 may engage with a flywheel and drive belt via one or more gears 811 or may engage with a direct drive motor and gears 813. It is contemplated and should be appreciated that alternative embodiments could be adapted for rotation of the interior vessel.

In some embodiments, the control system 205 can be in electrical communication with water control features 815, including one or more flow meter gauges 817, in further communication with one or more valves 819, and in further communication with fluid inlets/outlets 821. This allows for a user to operate the fluid content of the digestion chamber.

In some embodiments, the control system 205 further includes a foam detector 823, the foam detector configured to determine if a foam level is too high, thereby activating necessary actions, such as shutting off the digestion cycle.

Lastly, it is contemplated that the control system 205 can operate a time control 825, a cycle control 827, and a discharge control 829. These additional controls allow for the user to set a particular cycle, such as digestion cycle, a rinse cycle, and a cleaning cycle, and further set such cycles for a particular time. The discharge control configured to control discharge of the contents of the digestion chamber.

Figure 9:
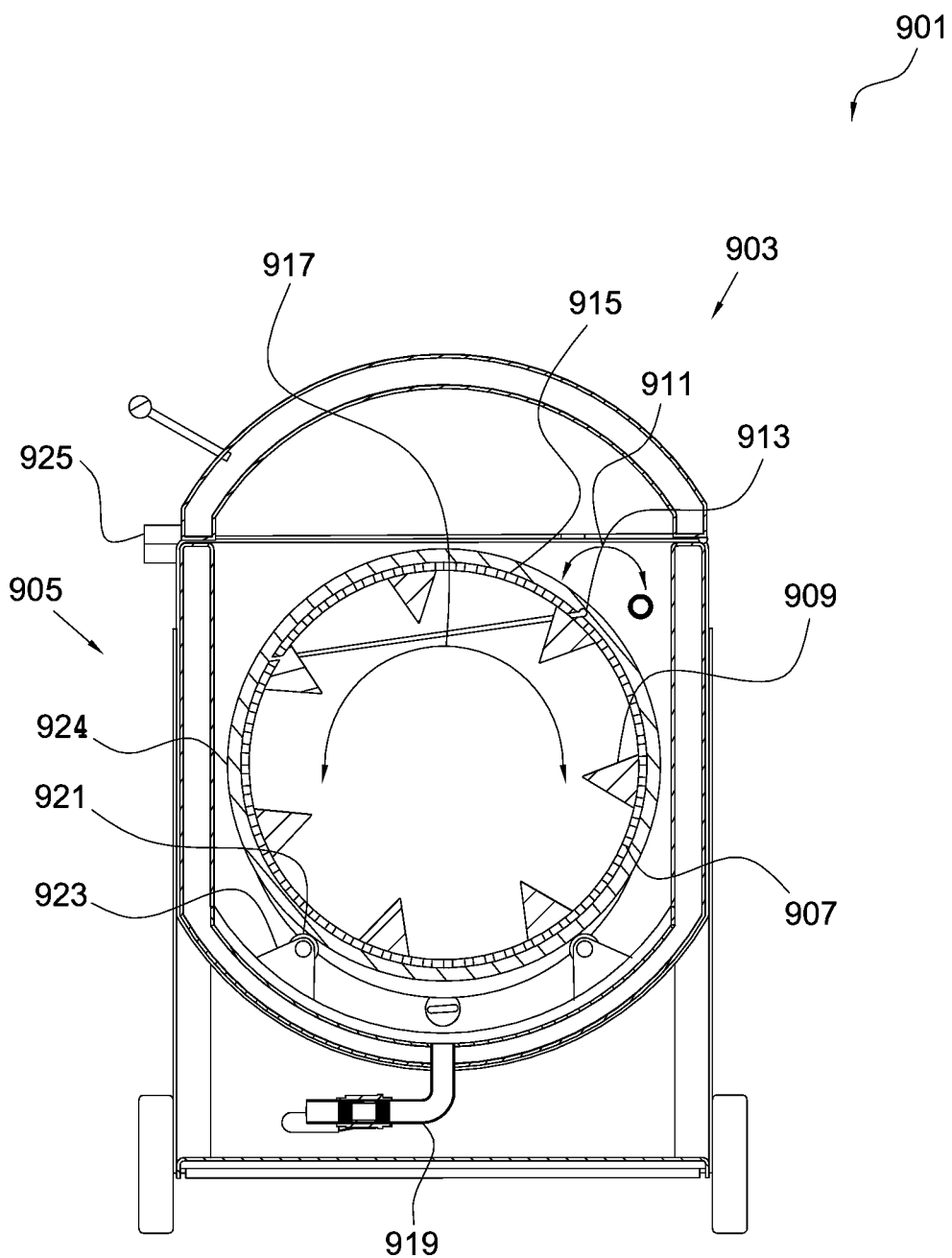
FIG. 9 is an end view of an alternative embodiment of an interior vessel within an exterior vessel having an insulation layer associated with a tissue digester in accordance with the present application.

In FIG. 9, an end view of an alternative embodiment 901 is shown. It should be appreciated that the features of the embodiments can be interchanged. In this embodiment, container 903 includes an exterior vessel 905 and an interior vessel 907, wherein the container 903 is positioned at an angle not parallel to a ground surface, but rather at an angle between 1 and 90 degrees. The interior vessel including baffles 909 as previously discussed, a lid 915 secured via hinges 913 and configured to open 911 to provide access therein. During use, the interior vessel is configured to rotate 917 as discussed above. As further shown, this embodiment demonstrates that the interior vessel can be cylindrical in shape, as opposed to polygonal, as shown in the previous embodiment. The lid can be positioned so as to bisect the interior vessel in two equal halves and may be mechanically fixed to allow removal of top half. This embodiment further includes one or more rotational bearings 921 held in place via a support system 923 and engaged with tracks 924 to provide for support during rotation of the interior vessel. The system further including a lock 925 for locking the door in a closed position.

Figure 10:
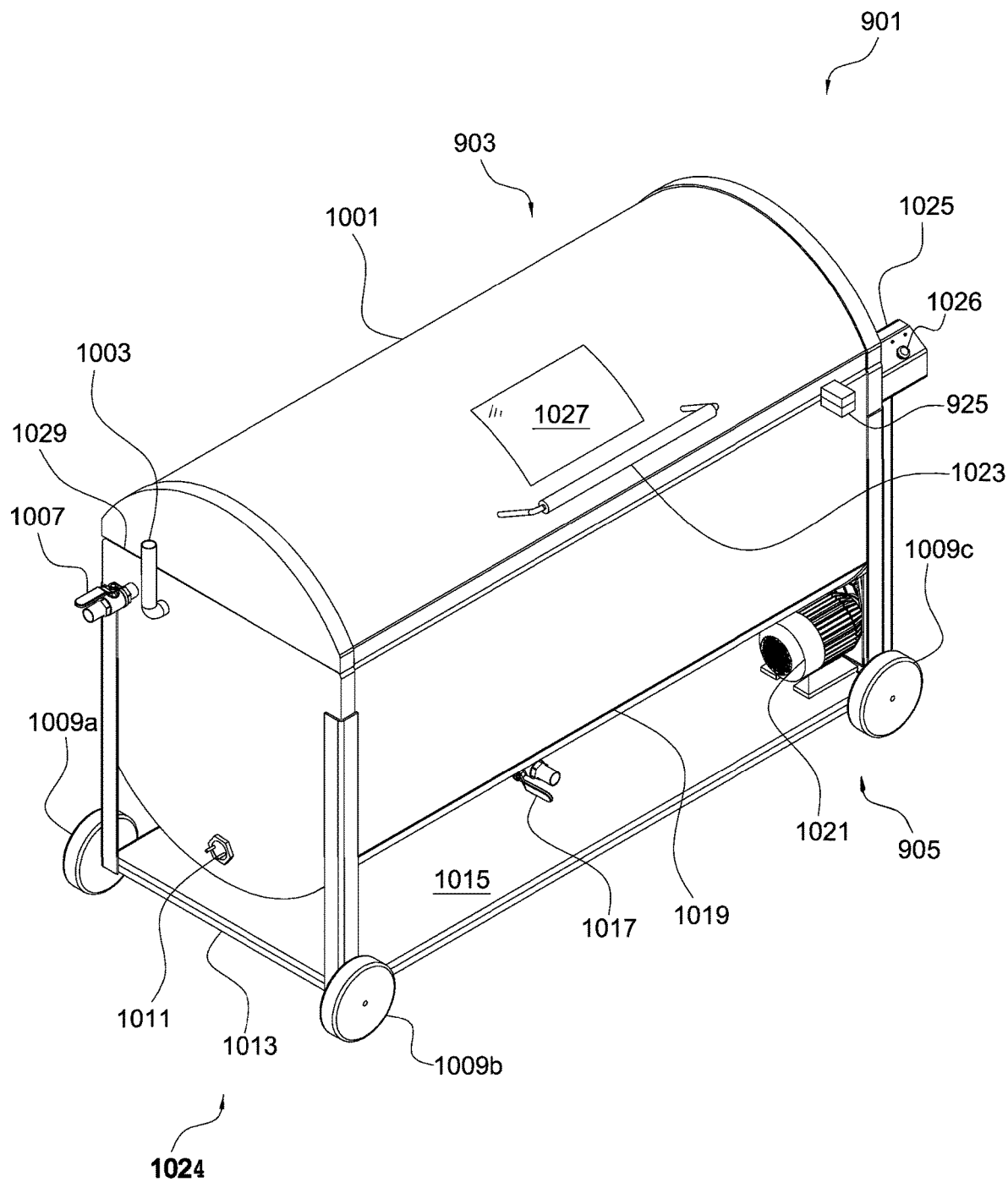
FIG. 10 is an isometric view of an alternative embodiment of a tissue digester system in accordance with the present invention.

In FIG. 10, yet another embodiment is shown, wherein a transparent viewing port 1027 is included for providing visibility into the chamber and a gasket 1029 provides for an improved seal. As shown, system 901 further includes the exterior vessel 1019, a lid 1001 with a handle 1023, and a support system 1024. The support system 1024 having wheels 1009, a platform 1015, and the like. In addition, system 901 includes the features previously discussed, including a vent pipe 1003, a fluid inlet 1007, a fluid outlet 1017, a heating element 1011, a control panel 1025 with buttons 1026, and a motor 1021.

Figure 11:
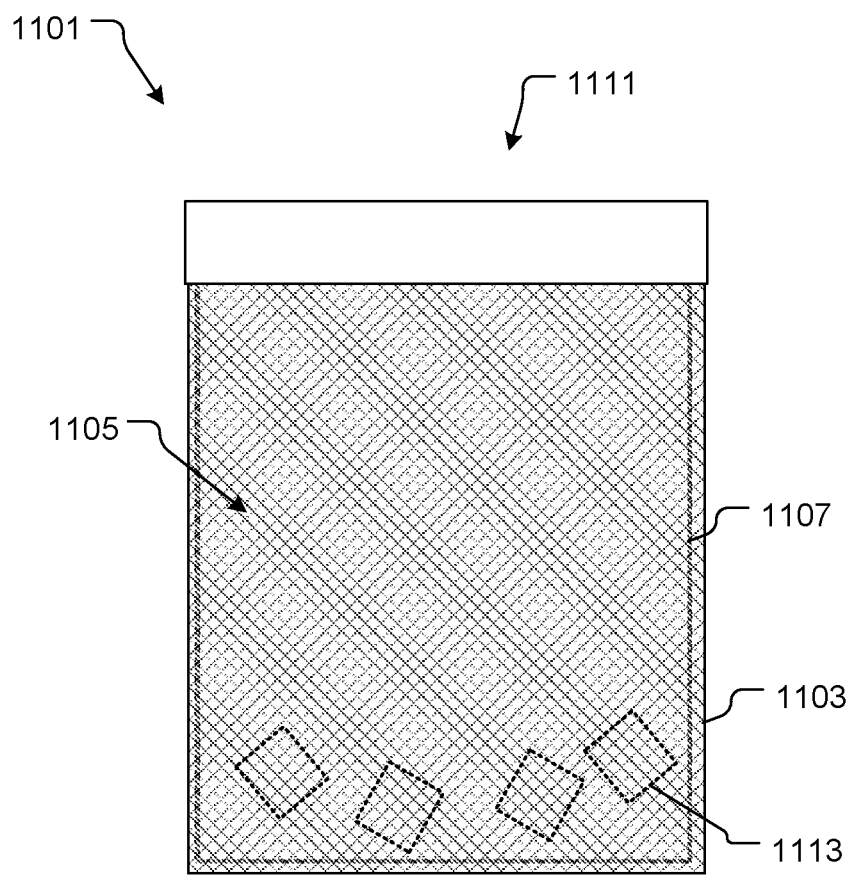
FIG. 11 is a front view of an alkaline hydrolysis bag configured to receive remains in accordance with the present invention.

In FIG. 11, a front view of one example of an alkaline hydrolysis (AH) bag 1101 configured to receive remains, is shown. The bag 1101 is configured to receive remains before being placed within the interior vessel for tissue digestion. In one embodiments, the AH bag has an exterior body 1103 composed of interlinked metal wires 1105 forming apertures. In some embodiments, an inner bag 1107 composed of a non-digestible copolymer bag is configured to be secured within the AH bag to receive the remains therein via an opening 1111. In yet other embodiments, one or more tumbling blocks of steel 1113 are positioned within the inner bag or AH bag to aid in separation and exposure of the soft tissue of the remains.

Figure 12:
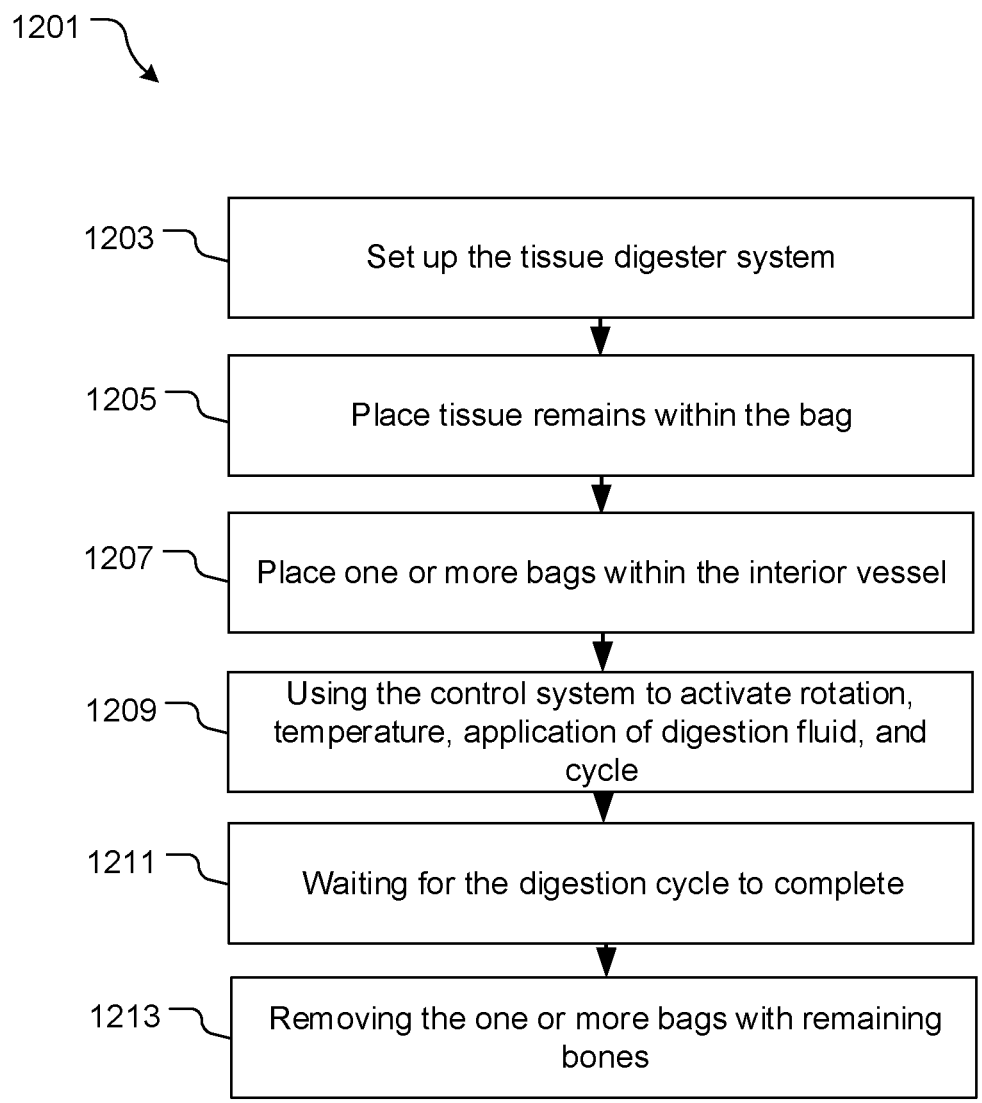
FIG. 12 is a flowchart of the method of use of the system of the present invention.

In FIG. 12, a flowchart 1201 depicts the general method of use of the system of the present invention. As shown, the tissue digester system is first set up as needed, the tissue digester system being configured to receive tissue remains within one or more AH bags, as shown with boxes 1203, 1205, 1207. The control system controls the temperature, application of digestion fluid, and the cycle, as shown with box 1209. Once the digestion cycle is completed, the digested soft tissue can be disposed of safely and the one or more bags with remaining bone can be ground up or otherwise processed, as shown with boxes 1211, 1213.

In the preferred embodiment, one or more dry chemicals such as potassium hydroxide or sodium hydroxide or a blend of both are added in sufficient measured quantity based on tissue weight. Water is added in a measured amount to the fully submersed tissue. The measured amount of a strong alkaline (base) digestive fluid is heated and maintained at a defined process temperature, typically 175 F-200 F for the duration of the process.

While rotating, the tissue bags tumble and impact the baffles attached to the interior vessel, wherein the baffles are configured to enhance agitation, abrasion and breakdown of tissue thereby reducing the process time.

In an embodiment, the motor speed and direction can be controlled and varied to achieve the most efficient and quickest processing time while maintaining the integrity of each tissue bag remains.

It should be appreciated that the system can be scaled up or down in length and diameter, as desired based on aesthetical, manufacturing, or functional considerations.

Among other things, it is an object of the present invention to provide a simple, cost effective, and efficient system to speed up the digestive process during alkaline hydrolysis of tissue that does not suffer from the problems or deficiencies associated with prior solutions.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A tissue digester system, comprising:
   a container for housing a digestion chamber having an exterior vessel for holding digestor fluid and an interior vessel, the container extending from a first end to a second end, the interior vessel having a plurality of perforations and having a plurality of baffles extending from an interior surface of the interior vessel;
   a lid secured to the exterior vessel and configured to provide access to the digestion chamber;
   one or more heating elements positioned to apply heat to the digestion chamber;
   a motor engaged with the interior vessel and configured to create rotational movement of the interior vessel;
   a control system, having:
   a temperature control in communication with the one or more heating elements and configured to control temperature application to the digestion chamber; and
   a movement control configured to control speed, direction, and amount of rotation of the interior vessel;
   wherein the control system is configured to rotate the interior vessel and heat the digestion chamber based on user commands; and
   wherein the digestion chamber is configured to break down remains through application of the digestor fluid to the tissue remains.

2. The system of claim 1, further comprising:
   the exterior vessel being double walled to provide insulation.

3. The system of claim 1, wherein the one or more heating elements are electric heating elements contained within the digestion chamber in direct contact with the digestor fluid.

4. The system of claim 1, further comprising:
a flywheel attached to the interior vessel and engaged with the motor via a drive belt, the motor configured to rotate the interior vessel via the drive belt and flywheel.

5. The system of claim 1, further comprising:
a direct drive motor and one or more gears configured to rotate the interior vessel via engagement with the motor.

6. The system of claim 1, further comprising:
an alkaline hydrolysis (AH) bag configured to receive remains therein, the AH bag having a body composed of interlinked metal wires forming apertures.

7. The system of claim 6, further comprising:
an inner non-digestible copolymer bag configured to be secured within the body of the AH bag.

8. The system of claim 6 wherein the inner bag contains tumbling blocks of steel to aid in separation and exposure of soft tissue of the tissue remains.

9. The system of claim 1, wherein the plurality of baffles extends from the first end of the interior vessel to the second end of the interior vessel.

10. The system of claim 1, further comprising:
a support system configured to support the outer vessel above a ground surface.

11. The system of claim 10, wherein the support system supports the container in a horizontal configuration such that the interior vessel rotates about an x-axis.

12. The system of claim 10, wherein the support system supports the container such that the container is positioned at an angle between 1 and 90 degrees.

13. The system of claim 1, further comprising:
a support system configured to support the inner vessel at each end of the inner vessel.

14. The system of claim 13, wherein the support system comprises:
a plurality of tracks and rotational bearings positioned along the exterior surface of the inner vessel.

15. The system of claim 1, wherein the lid further comprises a transparent viewing port configured to provide visibility into the digestion chamber.

16. The system of claim 1, further comprising:
a gasket seal configured to aid in sealing the lid against the exterior vessel; and a locking device configured to lock the lid in place in a closed position.

17. The system of claim 1, wherein the container further comprises:
a water inlet having a valve and a flow meter gage, the water inlet extending into the outer vessel and configured to receive a liquid therethrough.

18. The system of claim 17, wherein the valve is an electrical valve in communication with the control system, the control system configured to control fluid flow.

19. The system of claim 1, wherein the control system further comprises:
a time control configured to control a length of digestor cycle; and
a cycle control configured to control a rinse cycle and a cleaning cycle; and
a discharge control configured to control discharge of contents of the digestion chamber.

20. The system of claim 1, wherein the lid is positioned on a top portion of the exterior vessel.

21. The system of claim 1, wherein the interior vessel includes a hinged lid configured to provide access to an inside of the inner vessel.

22. The system of claim 1, wherein the interior vessel is cylindrical in shape.

23. The system of claim 1, wherein the interior vessel is polygonal in shape.

24. The system of claim 1, further comprising:
a foam detector positioned within the digestion chamber and in electrical communication with the control system, wherein the control system is configured to shut off the digestion cycle upon foam within the digestion chamber reaching the foam detector.

25. The system of claim 1, wherein the interior vessel is perforated steel.

26. The system of claim 1, wherein the vessel further comprises:
a drain extending into the digestion chamber and configured to drain fluid therefrom.

* * * * *